United States Patent
Wolf

(10) Patent No.: US 11,412,878 B1
(45) Date of Patent: Aug. 16, 2022

(54) ONE TOUCH COOKER

(71) Applicant: Mark Wolf, Brooklyn, NY (US)

(72) Inventor: Mark Wolf, Brooklyn, NY (US)

( * ) Notice: Subject to any disclaimer, the term of this patent is extended or adjusted under 35 U.S.C. 154(b) by 0 days.

(21) Appl. No.: 17/535,949

(22) Filed: Nov. 26, 2021

(51) Int. Cl.
| | |
|---|---|
| *A47J 27/00* | (2006.01) |
| *A47J 36/16* | (2006.01) |
| *A47J 36/08* | (2006.01) |
| *A47J 36/14* | (2006.01) |
| *A47J 31/44* | (2006.01) |
| *A47J 31/46* | (2006.01) |
| *A47J 31/54* | (2006.01) |
| *A47J 31/10* | (2006.01) |
| *A47J 27/18* | (2006.01) |
| *A47J 31/04* | (2006.01) |
| *A47J 31/057* | (2006.01) |

(52) U.S. Cl.
CPC .............. *A47J 27/00* (2013.01); *A47J 27/18* (2013.01); *A47J 31/04* (2013.01); *A47J 31/10* (2013.01); *A47J 31/4407* (2013.01); *A47J 31/4425* (2013.01); *A47J 31/4478* (2013.01); *A47J 31/468* (2018.08); *A47J 31/54* (2013.01); *A47J 36/08* (2013.01); *A47J 36/14* (2013.01); *A47J 36/165* (2013.01); *A47J 31/057* (2013.01); *A47J 2027/006* (2013.01)

(58) Field of Classification Search
CPC ............ A47J 2027/006; A47J 2027/008; A47J 27/10; A47J 27/18; A47J 31/04; A47J 31/057; A47J 31/0573
USPC .................................. 99/284, 339, 340, 357
See application file for complete search history.

(56) References Cited

U.S. PATENT DOCUMENTS

| | | | | | |
|---|---|---|---|---|---|
| 3,696,733 | A | * | 10/1972 | Beverett | A47J 31/0573 99/315 |
| 5,970,847 | A | * | 10/1999 | Saltzman | A47J 31/605 99/287 |
| 7,231,142 | B1 | * | 6/2007 | Leung | A47J 31/057 392/441 |
| 2015/0068403 | A1 | * | 3/2015 | Bentley | A47J 31/44 99/295 |
| 2017/0253473 | A1 | * | 9/2017 | Melville, Jr. | B67D 3/0077 |

FOREIGN PATENT DOCUMENTS

WO  WO-2020099019 A1 *  5/2020  ............. A47J 31/057

\* cited by examiner

*Primary Examiner* — Reginald Alexander

(57) ABSTRACT

An automated one touch cooker device that automatically cooks food items in a pot and the same pot can be used as a serving container. The automated one touch cooker comprises of a cooking vessel, a water reservoir and a body frame wherein the cooking vessel is used for cooking a food item, the water reservoir holds fresh water for cooking, and the body frame houses the water reservoir and the cooking vessel. The body frame further holds a water pump, a water heater, and other elements required to run the cooker device.

8 Claims, 12 Drawing Sheets

ONE TOUCH COOKER

FIELD OF THE INVENTION

The present invention relates to an automated cooker device that automatically cooks food or brew drinks in one pot.

BACKGROUND OF THE INVENTION

Cooking pasta, rice or any grains, and boiling water for coffee or tea is a time consuming process. There are so many kitchen gadgets available in the market which claim to make life easier for a user. However, there are very few gadgets which do more than one job. Either they make coffee or tea or cook food. The busy and overworked people are always looking for smart gadgets which can not only cook food easily, without needing to stand and monitor the cooking process, but also make various kinds of food items ranging from coffee to pasta to rice to lentils, etc. in one device.

Therefore, a need remains for a gadget that is portable, smart, easy to use, one pot that cooks food like pasta, grains, legumes or coffee or tea without needing any monitoring and automatically shuts off when cooking is done. Further, there is a need for a gadget wherein the container that is used to cook food will also be used as a serving bowl thereby reducing the number of dishes used for cooking and eating for a meal.

SUMMARY OF THE INVENTION

This Summary is provided to introduce a selection of concepts in a simplified form that are further described below in the Detailed Description of the invention. This Summary is not intended to identify key aspects or essential aspects of the claimed subject matter. Moreover, this Summary is not intended for use as an aid in determining the scope of the claimed subject matter.

The present application discloses an automated one touch cooker device that automatically cooks food items in a pot and the same pot can be used as a serving container.

It is an object of this invention to provide an automated one touch cooker with a stirring device to prevent food from sticking or clunking.

It is an additional object of the invention to provide an automated one touch cooker with a pot or vessel to cook food and serve in the same pot or vessel.

It is another object of this invention to provide an automated one touch one pot cooker wherein the said pot can be used to cook other food items like but not limited to pasta, rice, legumes, grains, tea, pour over coffee.

It is a further object of this invention to provide an automated one touch cooker comprising of a cooking vessel, a water reservoir and a body frame wherein the cooking vessel is used for cooking a food item, the water reservoir holds fresh water for cooking, and the body frame houses the water reservoir and the cooking vessel. The body frame further holds a water pump, a water heater, and other elements required to run the cooker device.

It is still another object of this invention to provide one touch cooker device consisting of a chamber at the top consisting of a water spout under the lid, a water dispersal plate and a filter insert and a water reservoir on one side to hold fresh water for coffee, a carafe on the opposite side placed on a removable coffee plate at the bottom of the body frame.

In a preferred embodiment, an automated one touch cooker device comprises a removable cooking vessel, wherein the said cooking vessel consists of a stirring device to prevent food from sticking, a removable straining lid to strain the water after cooking; a detachable water reservoir with a removable lid, wherein the said water reservoir provides fresh water for cooking; and a body frame, wherein the said body frame consists of a chamber at the top covered with a lid, a base assembly at the bottom, an outer water spout, and a cylindrical long body in the center, the said cooking vessel on one side, and the said water reservoir on the opposite side, wherein the said chamber has a water spout under the said lid, wherein the said base assembly houses a water pump, and a mixer drive for the stirring device in the cooking vessel, wherein the said cylindrical long body holds a water heater inside.

In another preferred embodiment, an automated one touch cooker device comprises a removable cooking vessel; a detachable water reservoir with a removable lid, wherein the said water reservoir provides fresh water for making coffee and a body frame, wherein the said body frame consists of a chamber at the top covered with a lid, a base assembly at the bottom, an outer water spout, and a cylindrical long body, the said cooking vessel on one side, and the said water reservoir on the opposite side, wherein the said top chamber has a water spout under the said lid, a coffee filter insert and a coffee water dispersal plate to make coffee, wherein the said base assembly houses a water pump, wherein the said cylindrical long body holds a water heater inside, wherein the said cooking vessel is removed to install a coffee plate on the base assembly to hold a carafe or a mug for coffee.

These together with other objects and advantages which will become subsequently apparent reside in the details of the invention as more fully described and claimed, reference being had to the accompanying drawings forming a part thereof, wherein like numerals refer to like parts throughout.

BRIEF DESCRIPTION OF THE DRAWINGS

The novel features of the invention, as well as the invention itself, both as to its structure and its operation will be best understood from the accompanying drawings, taken in conjunction with the accompanying description, in which similar reference characters refer to similar parts, and in which.

DETAILED DESCRIPTION OF THE INVENTION

Figure 1:
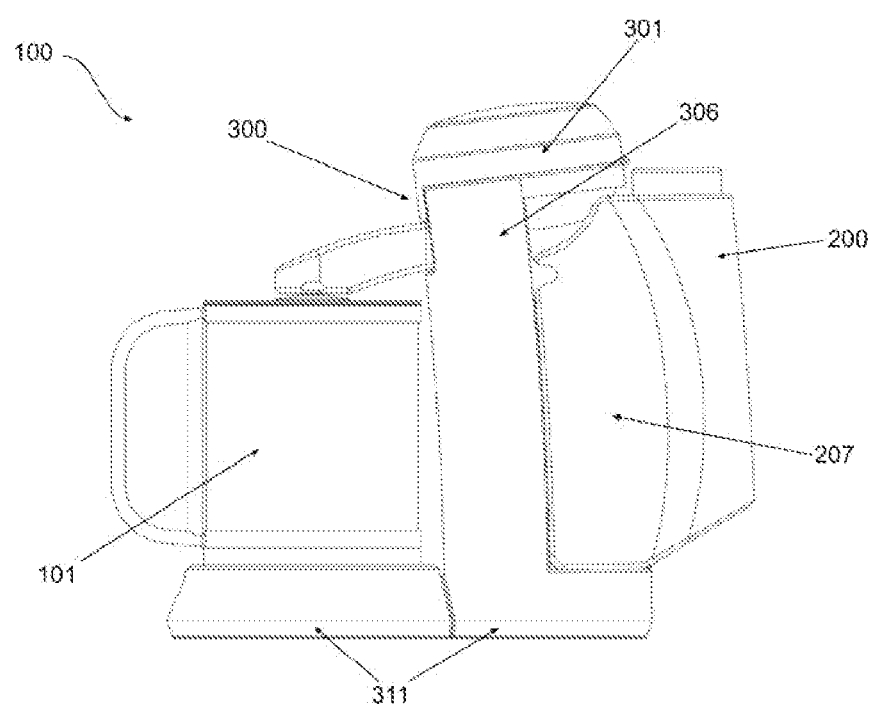
FIG. 1: shows a side view of the entire one touch cooker device.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skill in the art without departing from the scope of the invention.

As shown in FIG. 1, the one touch cooker device 100 comprises a body frame 300, a cooking vessel 101, and a water reservoir 200 wherein the body frame 300 receives the cooking vessel 101 and the water reservoir 200 for cooking a food item. The water reservoir 200 provides water for heating and boiling the food item in the cooking vessel 101. The body frame 300 of the one touch cooker device 100 is a housing station which holds the cooking vessel 101, water reservoir 200 and all the elements to enable cooking of an item in the cooking vessel 101 either by the instructions programmed into the device or by data manually fed by the user. The body frame 300 of the cooking device 100, is a continuous body wherein a top chamber 301 at the top, and a cylindrical long body 306, and a base assembly 311 consisting of two circular bases on the opposite sides of the cylindrical long body, houses all the parts which make the cooker device cook the contents stored therein.

Figure 2:
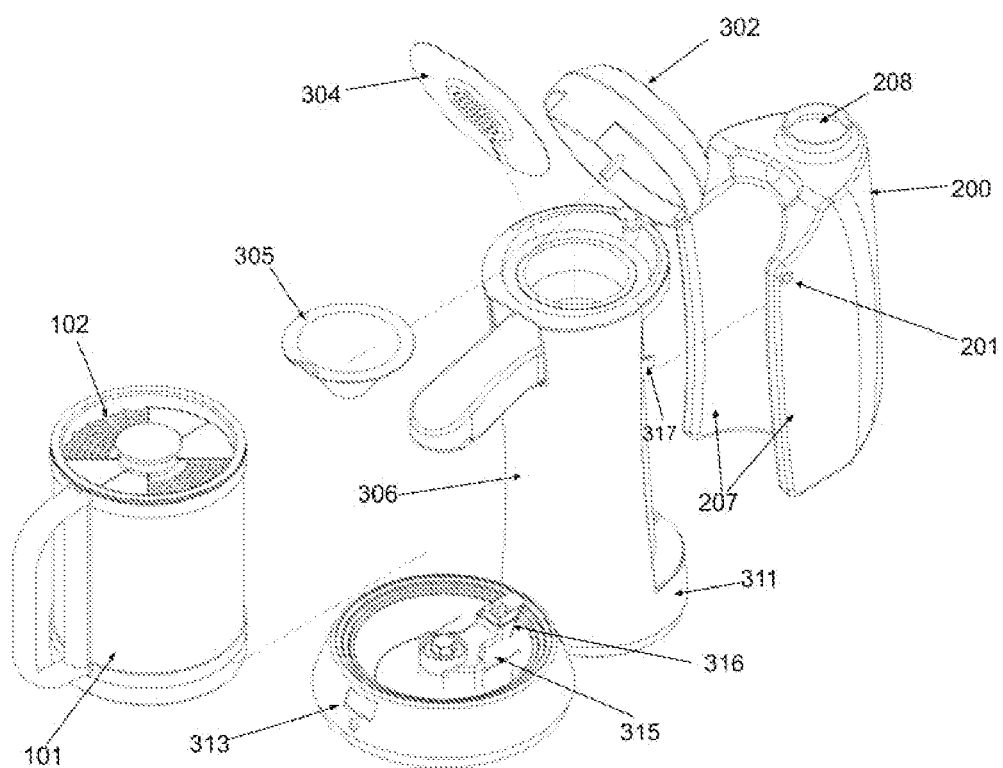
FIG. 2: shows a view of different parts of the automated one touch cooker device.
Figure 4:
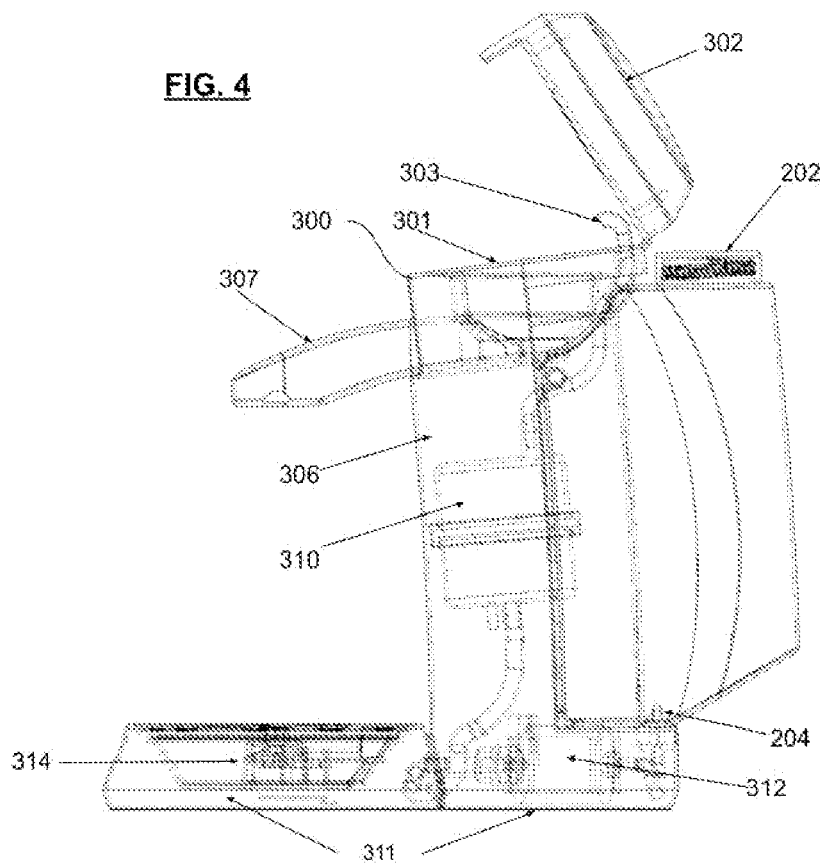
FIG. 4: depicts an inside view of body frame of the automated one touch cooker device.
Figure 5:
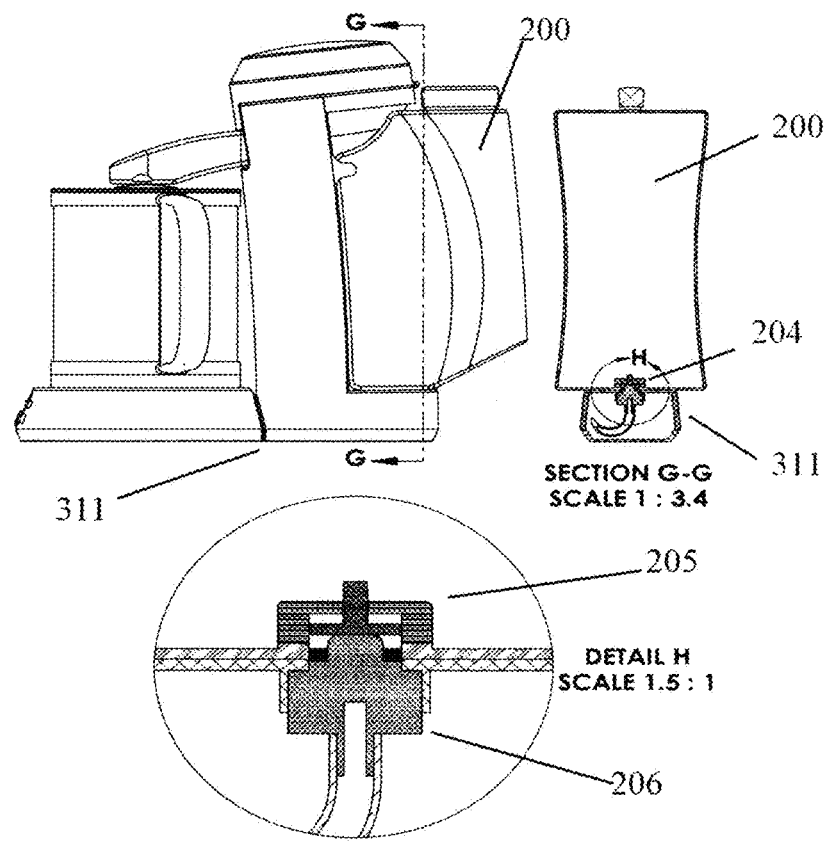
FIG. 5: depicts an enlarged view of water reservoir valve.

As seen in FIG. 1, the water reservoir 200 is a long container with U-shaped flaps 207 on each side of the container to attach to the cylindrical body 306 of the body frame 300 of the cooker device 100. The U-shaped flaps 207 start below the neck of the reservoir 200 and extend all the way down to cover the rest of the water reservoir 200. The water tank or reservoir 200 is removable from the body frame 300 by holding the reservoir and lifting it diagonally upward and away from the base of the body frame. As seen in FIG. 2, the side snap fit tabs 201 on the U-shaped flaps 207 at the top corner of the water reservoir 200 meet the snap tab 317 on the body frame 300. The snap fit tabs 201 on the water reservoir 200 and the snap tab 317 on the body frame 300, as shown in FIG. 2, connects the water reservoir 200 to the body frame 300 thereby holding the water reservoir 200 in its place as shown in FIG. 1. The water reservoir 200 has an opening 208, shown in FIG. 2, on the top to allow filling of water. As shown in FIG. 4, the opening 208 is closed with a removable lid 202 which is threaded into one continuous bead around the opening 208 at the top of the water reservoir 200. Further, the water reservoir 200 is centered on to the base assembly 311 of the body frame 300 by a valve 204. As can be seen in FIG. 5, Detail H, the vale 204 consists of a spring loaded valve plunger 205 at the bottom of the water reservoir 200 and a valve plunger displacement tab 206 in the base assembly 311 of the body frame 300. When the water reservoir 200 is snapped into body frame 300 of the one pot cooker device 100, the spring loaded valve plunger 205 of valve 204 opens up to connect with the valve plunger displacement tab 206 on the base assembly 311 thereby creating a seal between the spring loaded valve plunger 205 from the water reservoir 200 with the valve plunger displacement tab 206 on the base assembly 311.

The water reservoir can be made up of plastic, glass or stainless steel. In an embodiment where it is made up of stainless steel, it may have a long narrow glass or plastic window to show the level of water in the reservoir.

As seen in FIGS. 1 & 2, the cooking vessel 101 with a handle cooks a food item placed in there when attached to the body frame 300 of the one touch cooker device 100. The cooking vessel 101 can cook, but not limited to, pasta, rice, any other grains and the like. The cooking vessel 101 has a removable lid 102 with a screening section to help drain the water after pasta or rice or any other grain is cooked. The cooking vessel is made up of heat-resistant glass to withstand the high temperature at which food is cooked. Further, the glass material also helps in looking at the contents of the cooking vessel thereby making it easier for the user to see the stage of cooking. Furthermore, the cooking vessel can also be used as a serving bowl and the glass material makes it look trendy.

Figure 6:
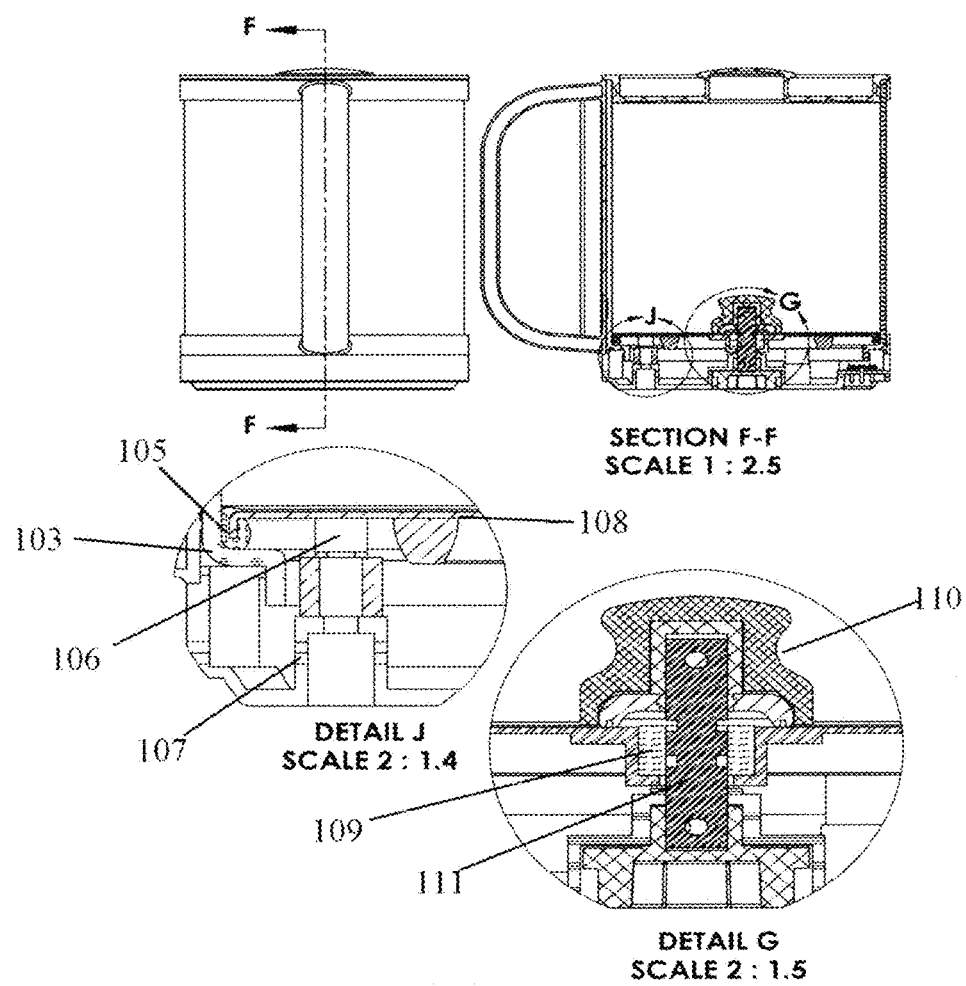
FIG. 6: shows a magnified view of cooking surface of the cooking vessel of the automated one touch cooker device.
Figure 7:
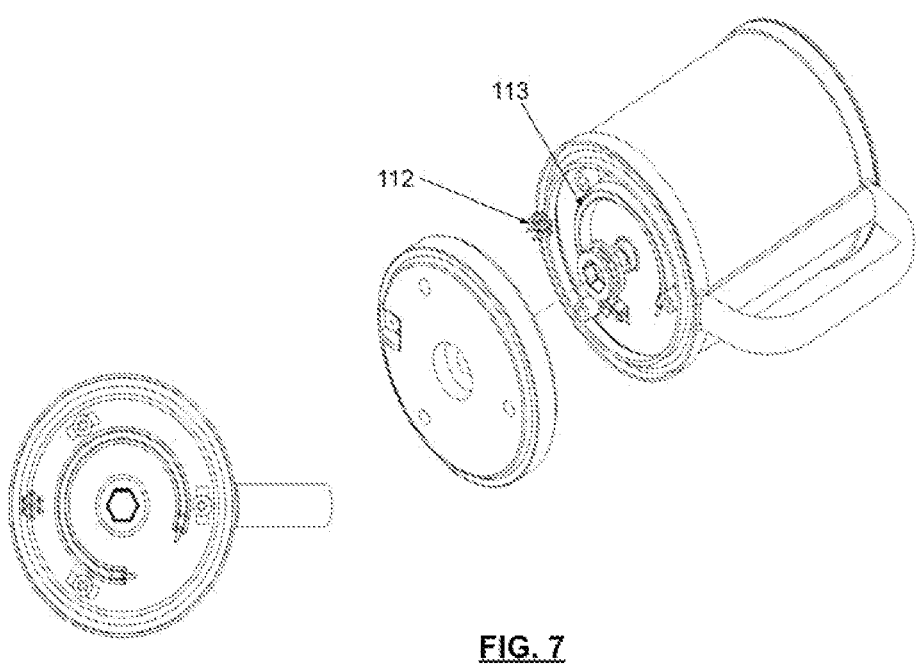
FIG. 7: shows the bottom surface of the cooking vessel of the automated one touch cooker device.

The inner base of the cooking vessel 101 has a stainless steel pan or a heating plate 108, shown in FIG. 6, which helps in transferring the heat from the heating elements 113, shown in FIG. 7, at the bottom of the cooking vessel 101 to the contents being cooked in the cooking vessel 101. The glass container of the cooking vessel 101 is attached to the metal heating plate 108 with a seal 105 as shown in FIG. 6. The heating plate 108 of the glass container of the cooking vessel 101 is provided with a mounting tab 106 located below the cooking surface of the cooking vessel. The cooking vessel 101 is supported on a mounting hole 107 which acts as an outer base of the cooking vessel 101.

The cooking vessel 101 further comprises a mixer blade 110 in the center to stir the contents within the glass container. The mixer blade 110 allows stirring of food items at different RPMs and intervals as per the food items which are programmed into the cooking device 100. In addition, the user also has the option to change the speed of the mixer blade 110 in the manual settings of the cooker device 100. Furthermore, the mixer blade 110 can be removed for contents that do not need any stirring while cooking. For e.g. it can be removed when the user wants to just boil water for tea. The mixer blade drive shaft 111 of the mixer blade 110, connects the mixer blade 110 with the motor coupling located in the assembly base. Further, there is a shaft seal 109 between the rotating shaft of the mixer blade 110 and the heating plate 108. In addition, the pasta mixer drive 315, shown in FIG. 2, and mixer motor 314, shown in FIG. 3, runs the mixer blade 110 of the cooking vessel 101.

The cooking vessel 101 is attached on the base assembly 311 of the body frame 300 via an electrical connector 112, shown in FIG. 7, located at the bottom of the cooking vessel 101 to the cooking vessel connector base 316, shown in FIG. 2, located in the base assembly 311.

Figure 8:
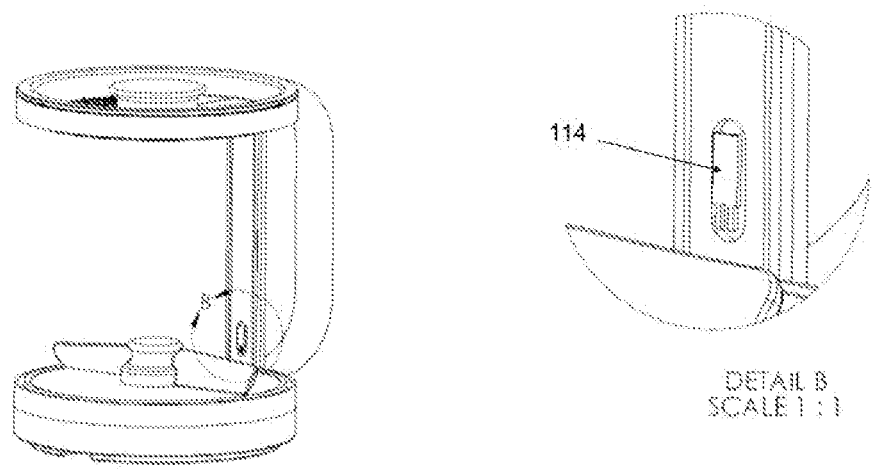
FIG. 8: shows the magnified view of the temperature sensor present in the cooking vessel of the automated one touch cooker device.

Detail B in FIG. 8, shows a temperature sensor 114 located at the bottom of the inside of the handle of the cooking vessel 101 to continuously monitor the temperature of the contents stored and cooked in the cooking vessel 101.

The cooking vessel can be detached from the base assembly and a coffee plate can be installed to hold a mug or carafe if making a single serving of coffee.

The water reservoir, the cooking vessel, carafe or coffee mug and the coffee plate are removable for serving and cleaning.

Figure 3:
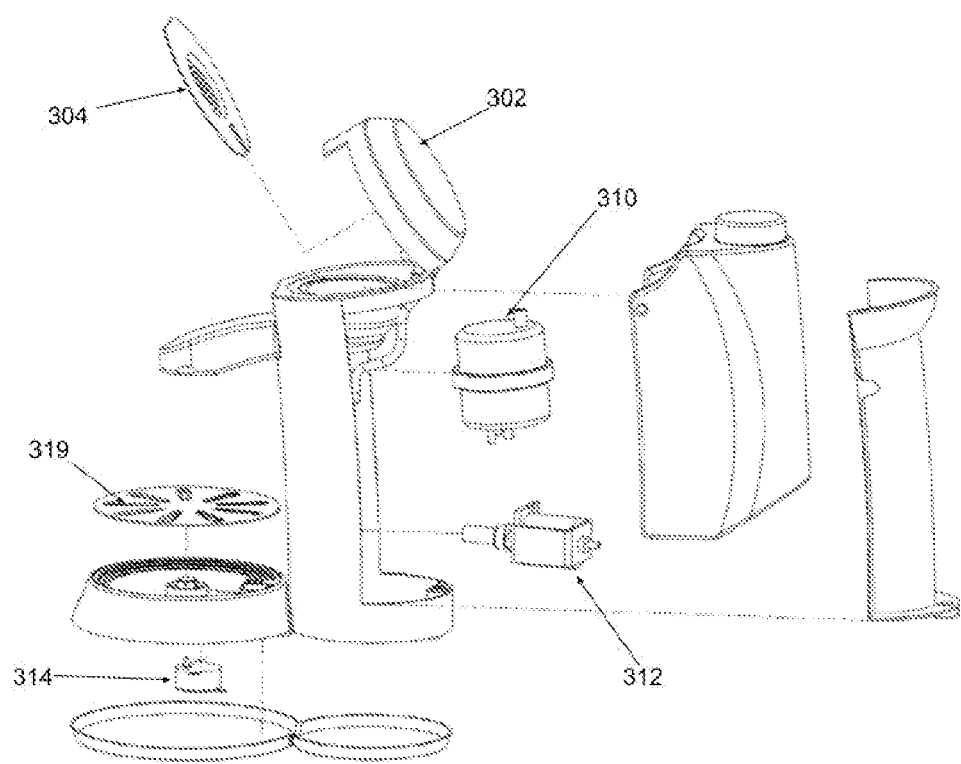
FIG. 3: shows a right side exploded view of the automated one touch cooker device.

As shown in FIGS. 3 & 4, the cylindrical body 306 of the body frame 300 houses an inline water heater 310 to heat the water stored in the water reservoir 200 to make coffee and pour hot water over the contents of the cooking vessel. The base assembly 311 of the body frame 300 contains a water pump 312 to pump the water from the water reservoir 200 through the water heater 310 and into the cooking vessel 101 or coffee carafe or mug. The body frame 300 has two water spouts wherein one is an outer water spout 307 which pours hot water in the cooking vessel 101 to cook the contents therein or to make pour over coffee in a carafe or mug placed on coffee plate 319 over the base assembly 311. Whereas the second water spout is a chamber water spout 303, as shown in FIG. 4, located in the top chamber 301 under the chamber lid 302 of the body frame 300, to pour hot water over the coffee grounds in the coffee filter insert 305.

When a cooking or coffee cycle is selected, the water is pumped from the water reservoir through a water pump into the water heater which heats the water to the desired temperature, up to 100 degree Celsius. In case of a coffee cycle, the water passes out of the water reservoir through the water pump and water heater and exits the chamber water spout 303 located in the top chamber 301 under the chamber lid 302 and passes through the coffee water dispersal plate 304, through the coffee beans, through filter insert 305, down the outer spout 307 and into a coffee mug or small carafe placed on the base assembly 311. In cases where a cooking cycle is selected, water leaves the water reservoir 200, passes through the outer water spout 307 and pours into the cooking vessel 101 for cooking the food item placed in the cooking vessel 101.

After the cooking vessel is filled with hot water, the cooking vessel heating element 113 continues to heat the cooking vessel, up to 100 degree Celsius based on the cooking cycle selected. The heating element 113 placed at the bottom of the cooking vessel turns on to maintain the temperature for boiling and cooking the food item and then lowers the temperature to low settings. As per the cooking cycle selected, the mixer blade turns on and spins periodically to prevent the food item from sticking to each other or to the cooking vessel. When the cooking cycle is complete, the device audibly alerts the user to drain the water out of the cooking vessel through the strainer lid 102, as shown in FIG. 2.

The user display 313, shown in FIG. 2, will show time, speed, mode, and other programmed settings to the user to select and start the device. In addition, the user display 313 provides the option of manual settings wherein the user can choose to manually select the parameters required to start and cook the food item in the cooking vessel. When the user desires to cook raw pasta in the cooking vessel, the user can start the device and select the pasta cook mode displayed on the user display 313, and select the cook amount, cook time by pressing + and − button located next to the user display. Once a cook mode, cook amount, cook time and speed of the mixer blade is selected and fed into the device, the water is pumped from the water reservoir, heated and poured over the pasta thereby cooking the pasta for a pre decided set time. After the cooking cycle is completed, the device signals to drain the water and then the device is turned off. The user drains the water and pasta is ready to be served in the same vessel.

Figure 9:
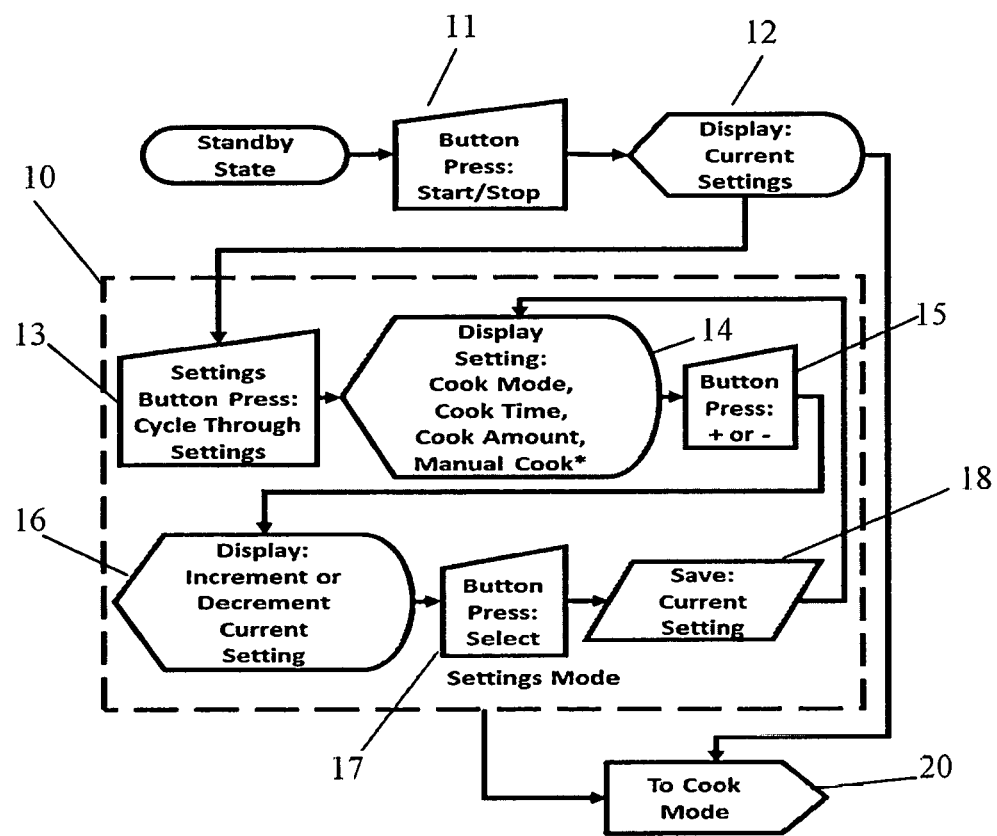
FIG. 9: shows User Interface and Operation Flow Chart for Settings Mode in the automated one touch cooker device.

FIGS. 9, 10, 11 & 12 shows user interface and operation flow charts on selecting various options to start the device as per one embodiment of the cooking device. FIG. 9 shows all the steps users can select in Settings Mode 10. The user will turn on and off the cooker device by selecting Start/Stop Button 11. When the device is turned on, it will display Current Settings 12 and the user can cycle through various settings pre-programmed into the device by pressing the settings button 13. Once the settings button 13 is pressed, the user display on the device will display settings 14 like Cook Mode, Cook Time, Cook Amount, Manual Cook for the user to select one at each level by pressing + or − button 15 on the device. The user will stop at the desired increment or decrement which will display the Current Setting 16. To select and finalize the Current Setting 16, the user will press Select Button 17 which will save 18 the Current Setting 16. The device will first take the user to Cook Mode 20 when settings button 13 is pressed.

Figure 10:
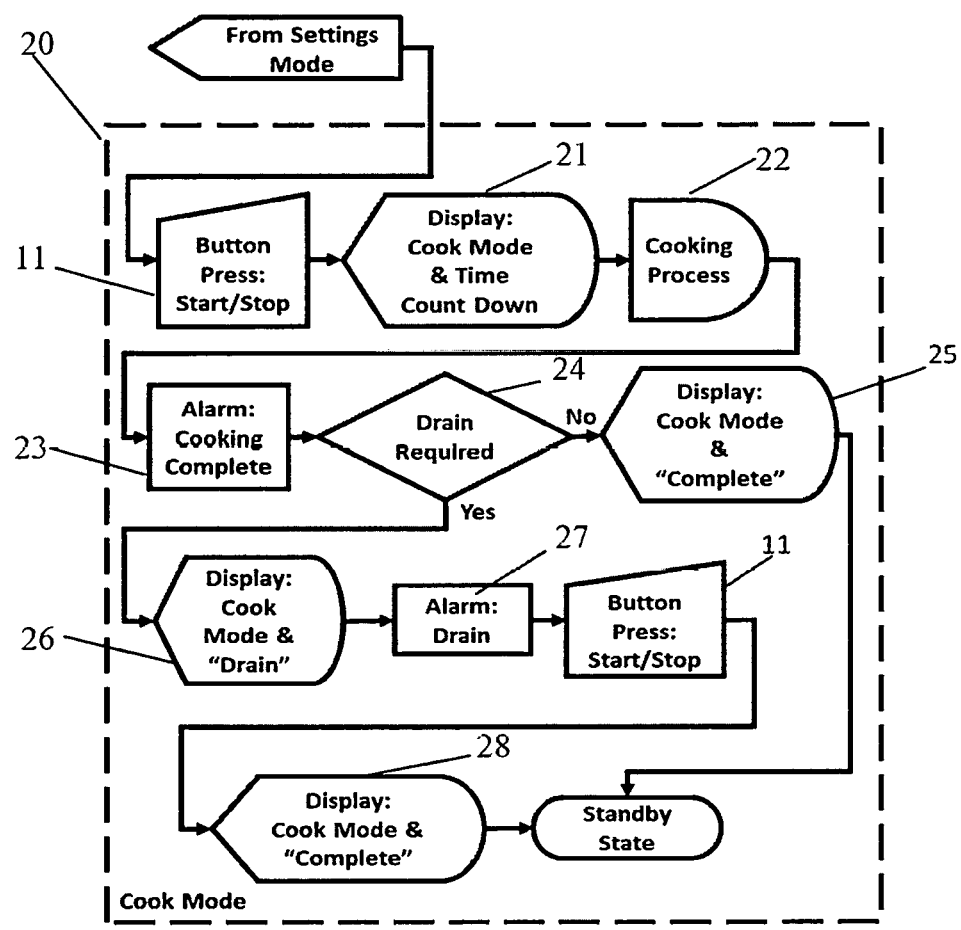
FIG. 10: shows User Interface and Operation Flow Chart for Cook Mode in the automated one touch cooker device.

The user interface and operation flow chart in FIG. 10 displays the steps of Cook Mode 20 in the device that will cook the items placed in the cooking vessel of the cooking device. After the user has pressed the Settings Button 13 and selected the Cook Mode 20, the device will Display: Cook Mode and Time countdown 21 for the cooking process 22 to start. Once the cooking process 22 is finished, the device will buzz an Alarm 23 to inform the user that the cooking process is complete. Depending upon the item being cooked in the cooking vessel, the device will notify the user to Drain 24 water if needed. If no draining is required, the device will Display: Cook Mode & Complete 25 and go into standby state. If draining is required, the device will Display: Cook Mode & Drain 26 and buzz an Alarm: Drain 27 to prompt the user to drain the water through the sectional lid of the cooking vessel. The user can press the Start/Stop Button 11 to stop the alarm 27 which will Display: cook mode & Complete 28 in the user display and the device will go into Standby State.

Figure 11:
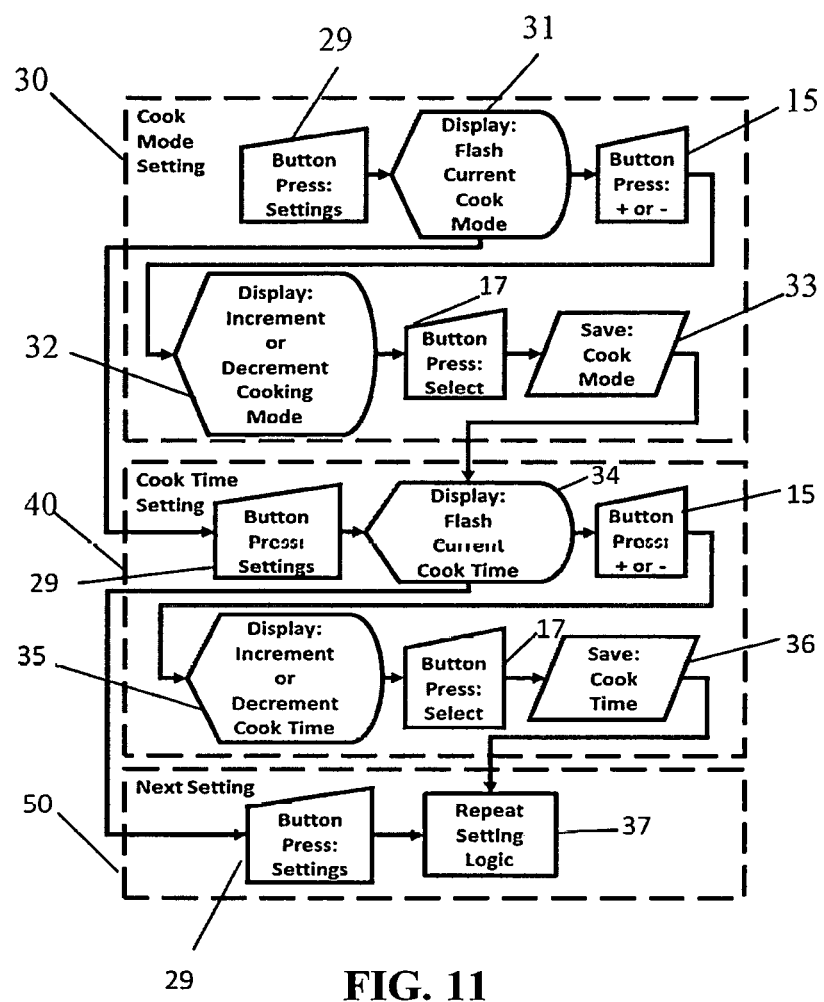
FIG. 11: shows detailed User Interface and Operation Flow Chart for different Settings in the automated one touch cooker device.

FIG. 11 shows User interface and operation flow chart of steps of Settings mode in the device in detail. It shows Cook Mode Setting 30, Cook Time Setting 40, and Next Setting 50 which can be Cook Amount wherein each one of these settings are selected from pressing Button: Settings 29 which will then Display the settings like Cook Mode 31, Cook Time 34, or any other setting 37 programmed therein one after the other. The user can press the + or − Button 15 which will display: increment or decrement Cooking Mode 32 in Cook Mode Setting 30, or increment or decrement Cook Time 35 in Cook Time Setting 40. Depending upon the setting desired, the user can press Button. Select 17 to Save: Cook Mode 33 or Cook Time 36.

Figure 12:
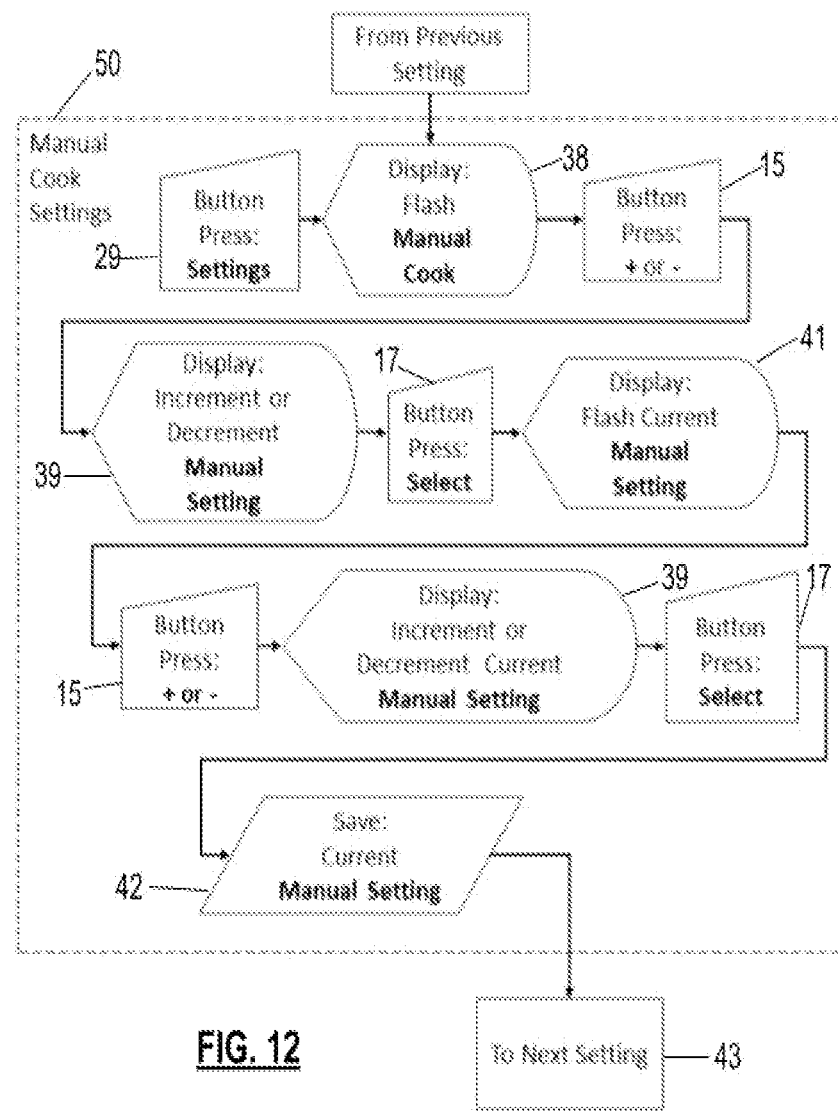
FIG. 12: shows User Interface and Operation Flow Chart for Manual Cook Settings in the one automated touch cooker device.

FIG. 12 shows User Interface and Operation flow chart for Manual Cook setting 50 which appears when Manual Cook is selected in Settings Mode 10. Manual Cook settings 50 will include mixer blade operation, cook temperature, cook cycles, etc. It can also be selected when the user does not want the programmed settings of the device and wishes to select its own parameters to start the cooking process. It will include pressing the Settings Button 29 to Display and Flash: Manual Cook 38 followed by pressing + or − Button 15 which will in turn Display: increment or decrement Manual Setting 39. The user will select 17 which will Display and Flash: Manual Setting 41 desired by the user. The said steps will be repeated until the user has chosen its desired parameters to initiate the cooking process. In one embodiment, the cooking device may also have an option of saving the current settings used by the user which may remain in memory until changed and be available as last used settings.

The one touch cooker device of the present invention makes it convenient for users to cook and eat on the go. The users can take the cooker with them on vacation, for camping as all they need is electricity connection and few ingredients to make a perfect meal or just boil water for tea or any other purpose or have coffee.

While many of the fundamental characteristics and features of the one touch cooker device have been described herein, with reference to particular embodiments thereof, a latitude of modification, various changes and substitutions are intended in the foregoing disclosure, and it should be apparent that in some instances some features of the invention will be employed without a corresponding use of other features without departing from the scope of the invention as set forth. It should be understood that such substitutions, modifications, and variations may be made by those skilled in the art without departing from the spirit and scope of the invention. Consequently, all such modifications and variations are included within the scope of the invention as defined herein.

The invention claimed is:

1. An automated one touch one pot cooker device comprising
a removable cooking vessel, wherein the said cooking vessel consists of a stirring device to prevent pasta from sticking, a removable straining lid to strain the water after cooking, and the said cooking vessel is used as a serving container;
a detachable water reservoir with a removable lid, and U-shaped flaps on each side of the water reservoir, wherein the said water reservoir provides fresh water for cooking pasta, and
a body frame, wherein the said body frame consists of a chamber at the top covered with a lid, a base assembly at the bottom, an outer water spout, and a cylindrical long body in the center with the said cooking vessel on one side of the said cylindrical long body, and the said water reservoir on the opposite side of the said cylindrical long body, wherein the said top chamber has a water spout under the said lid, wherein the said base assembly houses a water pump, and a mixer drive for the stirring device in the cooking vessel, and wherein the said cylindrical long body holds a water heater inside.

2. The automated one touch cooker device of claim 1, wherein the said water reservoir attaches to the body frame through snap fit tabs on the said U-shaped flaps of the said water reservoir meeting the snap tabs on the body frame.

3. The automated one touch cooker device of claim 1, wherein the base assembly further consists of an electrical connector to attach the cooking vessel to the body frame, a mixer motor to drive the stirring device within the cooking vessel and a valve to attach the water reservoir to the body frame.

4. The automated one touch cooker device of claim 1, wherein the device is programmed to include different cooking modes, cook times, cook amount, or manual settings to initiate the cooking process.

5. The automated one touch cooker device of claim 4, wherein the device cooks different food items and makes coffee or tea.

6. The automated one touch cooker device of claim 1, wherein a cooking cycle is selected, the water is pumped out of the water reservoir into the water heater to heat the water which is then passed through the outer water spout and poured into the cooking vessel for cooking the food item placed in the cooking vessel.

7. An automated one touch cooker device comprising
a removable cooking vessel, wherein the said cooking vessel consists of a stirring device to prevent food from sticking;
a detachable water reservoir with a removable lid, and U-shaped flaps on each side of the water reservoir, wherein the said water reservoir provides fresh water for making coffee and
a body frame, wherein the said body frame consists of a chamber at the top covered with a lid, a base assembly at the bottom, a first outer water spout, and a cylindrical long body in the center with the said cooking vessel on one side of the said cylindrical long body, and the said water reservoir on the opposite side of the said cylindrical long body, wherein the said top chamber has a second water spout under the said lid, a coffee filter insert and a coffee water dispersal plate to make coffee, wherein the said base assembly houses a water pump, wherein the said cylindrical long body holds a water heater inside, wherein the said cooking vessel is removed to install a coffee plate on the base assembly to hold a carafe or a mug for coffee.

8. The automated one touch cooker device of claim 7, wherein a coffee cycle is selected, the water is pumped by the water pump from the water reservoir into the water heater to heat the water to a desired temperature, the water exits the water spout under the lid in the top chamber and passes through the coffee water dispersal plate, the coffee beans, filter insert, out of the outer water spout and into a coffee mug or small carafe placed on the base assembly.

* * * * *